(12) United States Patent
Tamada et al.

(10) Patent No.: US 11,590,844 B2
(45) Date of Patent: Feb. 28, 2023

(54) GLASS SUBSTRATE AND IN-VEHICLE DISPLAY DEVICE

(71) Applicant: AGC Inc., Chiyoda-ku (JP)

(72) Inventors: Minoru Tamada, Tokyo (JP); Yasuhiro Inoue, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 307 days.

(21) Appl. No.: 15/931,705

(22) Filed: May 14, 2020

(65) Prior Publication Data

US 2020/0361315 A1 Nov. 19, 2020

(30) Foreign Application Priority Data

May 17, 2019 (JP) .............................. JP2019-093387

(51) Int. Cl.
*B60K 35/00* (2006.01)
*C03C 17/00* (2006.01)

(52) U.S. Cl.
CPC ............ *B60K 35/00* (2013.01); *C03C 17/002* (2013.01); *B60K 2370/152* (2019.05); *B60K 2370/166* (2019.05); *B60K 2370/37* (2019.05); *C03C 2217/485* (2013.01)

(58) Field of Classification Search
CPC .............. B60K 35/00; B60K 2370/152; B60K 2370/166; B60K 2370/37; B60K 2370/693; B60K 37/04; C03C 17/002; C03C 2217/485; C03C 2217/425; C03C 2217/732; C03C 2217/734; C03C 15/00; C03C 17/3405; C03C 17/42; C03C 21/002; C03C 17/001; C03C 17/3417; C03C 2218/119; C03C 2218/156; C03C 2218/365; B24B 9/08; B60R 1/00; G02F 1/1333; G09F 9/00; G09F 9/35
See application file for complete search history.

(56) References Cited

U.S. PATENT DOCUMENTS

| | | | |
|---|---|---|---|
| 2015/0060401 A1* | 3/2015 | Chang | C03C 19/00 216/38 |
| 2015/0165548 A1* | 6/2015 | Marjanovic | C03B 33/091 219/121.73 |
| 2017/0129806 A1* | 5/2017 | Fujii | C03C 3/085 |
| 2017/0233593 A1* | 8/2017 | Ogata | B41M 1/12 428/210 |
| 2018/0339939 A1 | 11/2018 | Hashimoto et al. | |
| 2019/0101787 A1 | 4/2019 | Inoue et al. | |

FOREIGN PATENT DOCUMENTS

JP 2017-129827 A 7/2017
JP 2019-64874 A 4/2019

* cited by examiner

*Primary Examiner* — Nathan L Van Sell
(74) *Attorney, Agent, or Firm* — Oblon, McClelland, Maier & Neustadt, L.L.P.

(57) ABSTRACT

A glass substrate includes a pair of main surfaces including a first main surface and a second main surface opposed to the first main surface; an edge surface arranged along a direction orthogonal to the pair of main surfaces; and a connecting surface arranged between the first main surface and the edge surface. The connecting surface has a plurality of pores. A difference between a 50% particle diameter of the pores in a portion 20 μm distant from the first main surface and a 50% particle diameter in a portion 20 μm distant from the edge surface is 10 μm or less.

12 Claims, 2 Drawing Sheets

GLASS SUBSTRATE AND IN-VEHICLE DISPLAY DEVICE

TECHNICAL FIELD

The present invention relates to a glass substrate and an in-vehicle display device.

BACKGROUND ART

Conventionally, a cover member for protecting a display panel such as liquid crystal panel has been used in a display device.

For enhancing the visibility of the display panel, a functional layer such as antireflection layer and antifouling layer is often provided in the cover member.

A light-shielding layer is often provided on the outer periphery of the cover member so as to enhance the design property or conceal wiring.

Meanwhile, an in-vehicle display device such as a car navigation system or an in-vehicle display device for a rear seat (specifically, a rear seat entertainment (RSE) device on which a rear seat passenger watches video, etc.) is mounted on a vehicle such as automobile. The RSE device is often used by fixing it to the rear surface of a front seat.

Also in such an in-vehicle display device, a cover member is provided from the viewpoint of protecting a display panel and recently, in view of texture, use of not a film-made cover member but a glass-made cover member is desired.

From a safety standpoint, a glass substrate used as the cover member of an in-vehicle display device is required to have such high impact resistance as to cause no cracking even if it is hit by the head, etc. of a passenger in the event of a traffic accident such as automobile crash.

Above all, when the head of a passenger hits an edge portion of the cover member from not a vertical direction but an oblique direction relative to the main surface of the cover member, cracking starting from the edge portion sometimes occurs in the cover member.

Patent Literature 1 discloses a technique where the edge impact resistance against hitting from an oblique direction is enhanced by configuring a boundary surface disposed between a main surface and a side surface to have a plurality of concave portions and specifying the frequency of a maximum curvature in the frequency distribution of curvatures at the bottom of the concave portion to be less than 3%.

CITATION LIST

Patent Literature

Patent Literature: Japanese Patent Application No. 2017-192590

SUMMARY OF INVENTION

Technical Problem

However, the present inventors found that when this technique is applied, the following problem is involved.

That is, when a printing layer is provided on the main-surface outer periphery and boundary surface of a glass substrate to which the technique described in Patent Literature 1 is applied, the linearity of the outer peripheral edge may be deteriorated to impair the appearance.

It was also found that when a functional layer is provided on the main surface and boundary surface of a glass substrate to which the technique described in Patent Literature 1 is applied, the color tint differs between the main surface having provided thereon the functional layer and the boundary surface having provided thereon the functional layer and the appearance may be impaired.

Accordingly, an object of the present invention is to provide a glass substrate that increases an edge impact resistance against hitting from an oblique direction and enhances the appearance of a printing layer or functional layer.

Solution to Problem

The present inventors have made intensive studies so as to attain the object above, as a result, the present invention has been accomplished.

More specifically, the present invention is a glass substrate having a pair of main surfaces including a first main surface and a second main surface opposed to the first main surface, an edge surface arranged along a direction orthogonal to the pair of main surfaces, and a connecting surface arranged between the first main surface and the edge surface, wherein the connecting surface has a plurality of pores and the difference between the 50% particle diameter of the pores in a portion 20 μm distant from the first main surface and the 50% particle diameter of the pores in a portion 20 μm distant from the edge surface is 10 μm or less.

Advantageous Effects of the Invention

According to the present invention, a glass substrate that increases an edge impact resistance against hitting from an oblique direction and enhances the appearance of a printing layer or functional layer is obtained.

DESCRIPTION OF EMBODIMENTS

First, the background of how this embodiment has been achieved is described in greater detail. The present inventors found that when a printing layer is provided on the main-surface outer periphery and boundary surface of a glass substrate to which the technique described in Patent Literature 1 is applied, the linearity of the outer peripheral edge of the printing layer may be deteriorated to impair the appearance.

It was also found that when a functional layer is provided on the main surface and boundary surface of a glass substrate to which the technique described in Patent Literature 1 is applied, the color tint differs between the main surface having provided thereon the functional layer and the boundary surface having provided thereon the functional layer and the appearance may be impaired.

As a result of intensive studies, the present inventors estimated the following factors.

That is, it is estimated that when a printing layer is provided on the main surface and boundary surface of a glass substrate to which the technique described in Patent Literature 1 is applied, since a part of the boundary surface is too smooth, the contact angle between the outer peripheral edge of the printing layer and the glass substrate decreases and a part of the outer peripheral edge of the printing layer slides down the boundary surface, as a result, the linearity is impaired.

It is also estimated that when a functional layer is provided on a glass substrate to which the technique described in Patent Literature 1 is applied, since a part of the boundary surface is too smooth, the functional layer causes optical interference, as a result, the color tint differs between the main surface and the boundary surface.

On the other hand, if the boundary surface is too rough, the edge impact resistance against hitting from an oblique direction is reduced.

Based on these estimations, the present inventors have found that according to the following technique, the edge impact resistance against hitting from an oblique direction can be maintained and the appearance of the printing layer or functional layer can be enhanced.

More specifically, this is a glass substrate having a pair of main surfaces including a first main surface and a second main surface opposed to the first main surface, an edge surface arranged along a direction orthogonal to the pair of main surfaces, and a connecting surface arranged between the first main surface and the edge surface, wherein the connecting surface has a plurality of pores and the difference between the 50% particle diameter of the pores in a portion 20 μm distant from the first main surface and the 50% particle diameter of the pores in a portion 20 μm distant from the edge surface is 10 μm or less.

The angle made by the first main surface and the connecting surface is preferably 40° or more and 55° or less. Within this range, the linearity of the printing layer can be more enhanced.

The curvature radius R of the boundary curve between the first main surface and the connecting surface is preferably 350 μm or less. Further, the curvature radius R is preferably 50 μm or more.

The dispersion of the particle diameter of pores in the connecting surface is preferably 5 μm or less. Further, the dispersion of the particle diameter of pores is preferably 1 μm or more. Within this range, the variation in the edge impact resistance can be suppressed. In addition, the optical interference of the functional layer is reduced, and the difference in color between the main surface and the connecting surface can be decreased. Furthermore, orientation of scattered light due to an excessively uniform pore size can be reduced.

The 90% particle diameter of the pores is preferably 10 μm or more. Within this range, the variation in the edge impact resistance can be further enhanced.

This embodiment is explained in more detail.
(Glass Substrate)

Examples of the glass usable as the glass substrate include a glass substrate made of a general glass including silicon dioxide as a main component, such as soda-lime silicate glass, aluminosilicate glass, borosilicate glass, alkali-free glass, and silica glass.

It is preferable that the glass substrate has a composition which renders the glass capable of being formed or being strengthened by a chemical strengthening treatment. The composition preferably contains sodium.

The glass substrate is not particularly limited in the composition thereof, and glasses having various compositions can be used. Examples of the glass include aluminosilicate glasses having the following compositions as represented by mole % based on oxides.

(i) A glass including from 50 to 80% of $SiO_2$, from 2 to 25% of $Al_2O_3$, from 0 to 20% of $Li_2O$, from 0 to 18% of $Na_2O$, from 0 to 10% of $K_2O$, from 0 to 15% of $MgO$, from 0 to 5% of $CaO$, from 0 to 5% of $Y_2O_3$, and from 0 to 5% of $ZrO_2$.

(ii) A glass which includes from 50 to 74% of $SiO_2$, from 1 to 10% of $Al_2O_3$, from 6 to 14% of $Na_2O$, from 3 to 11% of $K_2O$, from 2 to 15% of $MgO$, from 0 to 6% of $CaO$, and from 0 to 5% of $ZrO_2$ and in which the total content of $SiO_2$ and $Al_2O_3$ is 75% or less, the total content of $Na_2O$ and $K_2O$ is from 12 to 25%, and the total content of $MgO$ and $CaO$ is from 7 to 15%;

(iii) A glass including from 68 to 80% of $SiO_2$, from 4 to 10% $Al_2O_3$, from 5 to 15% of $Na_2O$, from 0 to 1% of $K_2O$, from 4 to 15% of $MgO$, and from 0 to 1% of $ZrO_2$;

(iv) A glass which includes from 67 to 75% of $SiO_2$, from 0 to 4% of $Al_2O_3$, from 7 to 15% of $Na_2O$, from 1 to 9% of $K_2O$, from 6 to 14% of $MgO$, and from 0 to 1.5% of $ZrO_2$ and in which the total content of $SiO_2$ and $Al_2O_3$ is from 71 to 75%, the total content of $Na_2O$ and $K_2O$ is from 12 to 20%, and the content of $CaO$, if $CaO$ is contained, is less than 1%.

Processes for producing the glass substrate are not particularly limited. Desired raw materials for glass are introduced into a melting furnace and melted by heating at 1,500 to 1,600° C. The molten glass is refined and then fed to a forming device, formed into a plate shape, and cooled slowly. Thus, the glass substrate can be produced. Forming methods for producing the glass substrate are not particularly limited, and use can be made, for example, of a downdraw process (e.g., an overflow downdraw process, a slot downdraw process, or a redraw process), a float process, a rolling-out process, or a pressing process.

It is preferred to perform a chemical strengthening treatment in order to heighten the strength of the glass substrate. In the case of conducting the chemical strengthening treatment, the chemical strengthening treatment is preferably performed after the later-described chamfering and etching treatment.

Methods for the chemical strengthening treatment is not particularly limited. The main surface of the glass substrate is subjected to ion exchange to form a surface layer in which compressive stress remains. Specifically, at a temperature not higher than the glass transition temperature, alkali metal ions having a small ionic radius (e.g., Li ions or Na ions) contained in the glass near the main surfaces of the substrate are replaced with alkali metal ions having a larger ionic radius (e.g., Na or K ions for replacing Li ions, or K ions for replacing Na ions). Thus, compressive stress remains in the main surface of the glass substrate to improve the strength of the glass substrate.

The glass substrate preferably satisfies the requirements shown below. Such requirements can be satisfied by performing the chemical strengthening treatment.

The glass substrate has a surface compressive stress (hereinafter referred to as "CS") of preferably 400 MPa or higher and 1,200 MPa or less, more preferably 700 MPa or higher and 900 MPa or less. In the case where the CS is 400 MPa or higher, this glass substrate has sufficient strength for practical use. In the case where the CS is 1,200 MPa or less, the glass substrate can withstand the compressive stress of itself and the glass substrate does not rupture by itself. The CS of the glass substrate is more preferably 700 MPa or higher and 850 MPa or less.

The glass substrate has a depth of the stress layer (hereinafter referred to as "DOL") of preferably 15 μm or larger and 50 μm or less, more preferably 20 μm or larger and 40

μm or less. In the case where the DOL is 15 μm or larger, the glass substrate does not readily receive scratches to rupture, even when a keen jig such as a glass cutter is used. In the case where the DOL is 40 μm or less, this glass substrate can withstand the compressive stress of itself and the glass substrate does not rupture by itself. The DOL of the glass substrate is more preferably 25 μm or larger and 35 μm or less.

In the case where the glass substrate contains $Li_2O$, the strength thereof can be further improved by subjecting this glass substrate to two or more chemical strengthening treatments.

Specifically, for example, a first treatment is performed in which the glass substrate is brought into contact with an inorganic-salt composition mainly including, for example, sodium nitrate to conduct ion exchange between Na and Li. Subsequently, in a second treatment, the glass substrate is brought into contact with an inorganic-salt composition mainly including, for example, potassium nitrate to conduct ion exchange between K and Na. This method is preferred because a compressive stress layer having a large value of DOL and having high surface stress can be formed.

The thickness of the glass substrate can be suitably selected in accordance with applications. For example, the thickness is preferably 0.1 mm or larger and 5 mm or less, more preferably 0.2 mm or larger and 2 mm or less, still more preferably 0.7 mm or larger and 1.5 mm or less.

In the case where the glass substrate is to be subjected to the chemical strengthening treatment, the thickness of the glass substrate is usually preferably 5 mm or less, more preferably 3 mm or less, from the standpoint of effectively performing the treatment.

The dimensions of the glass substrate can be suitably selected in accordance with applications. For use as the in-vehicle display device such as a car navigation system, the glass substrate preferably has a size of 50 mm×100 mm or larger and 2,000 mm×1,500 mm or less and a thickness of 0.5 mm or larger and 4 mm or less. For use as the RSE device, the glass substrate preferably has a size of 100 mm×100 mm or larger and 400 mm×600 mm or less and a thickness of 0.5 mm or larger and 4 mm or less.

With respect to shape, the glass substrate may have not only a flat shape, but also a shape having a curved surface, as of a substrate having one or more bent portions. Recently, a display device having a curved screen surface has appeared.

In the case where the glass substrate has a curved surface, the entire surface of the glass substrate may be curved, or the surface of the glass substrate may be configured of one or more curved portions and one or more flat portions. Examples of the glass substrate in which the entire surface is curved include a glass substrate having a cross-section of a circular-arc shape.

In the case where the glass substrate has a curved surface, the radius of curvature (hereinafter referred to also as "R of the glass substrate") thereof can be suitably set in accordance with applications of the glass substrate, the kind thereof, etc., and is not particularly limited. The R of the glass substrate is preferably 25,000 mm or less, more preferably 1 mm or larger and 5,000 mm or less, still more preferably 5 mm or larger and 3,000 mm or less. In the case where the R of the glass substrate is less than the upper limit, this glass substrate has better design attractiveness than flat plates. In the case where the R of the glass substrate is larger than the lower limit, a functional layer can be evenly formed also on the curved surface.

At least one main surface of the glass substrate of this embodiment may be subjected to an anti-glare treatment (sometimes referred to as "antiglare treatment" or "AG treatment). The method for the anti-glare treatment is not particularly limited, and a method of applying a surface treatment to a main surface of the glass substrate to form desired irregularities can be utilized.

Specifically, the method includes a method of subjecting the main surface of the glass substrate to a chemical treatment, for example, a method of applying a frost treatment. The frost treatment can be conducted, for example, by immersing the glass substrate as a material to be treated in a mixed solution of hydrogen fluoride and ammonium fluoride, thereby chemically surface-treating the immersed surface.

Other than such a method by a chemical treatment, for example, a method by a so-called sand blast treatment of blowing a crystalline silicon dioxide powder, silicon carbide powder, etc. on the glass substrate surface with the aid of compressed air, or by a physical treatment of polishing the glass substrate surface by means of a brush which is attached with a crystalline silicon dioxide powder, silicon carbide powder, etc. and wetted with water, can also be utilized.

In particular, the method of applying a frost treatment of chemically surface-treating the grass substrate with a liquid chemical such as hydrogen fluoride is less likely to involve formation of microcracks in the surface of the material to be treated and a decrease in the mechanical strength. This is therefore favorably used as the method for applying a surface treatment to the glass substrate. The surface on which irregularities are formed by an anti-glare treatment of the glass substrate may have microcracks with a maximum depth of less than 3 μm, because such shallow microcracks are less likely to bring about a decrease in the mechanical strength.

After irregularities are thus formed by a chemical surface treatment (frost treatment) or a physical surface treatment, the glass surface is, in common practice, chemically etched so as to regulate the surface profile. This etching makes it possible to adjust the haze to a desired value by the etching amount, eliminate the cracks formed by a sand blast treatment, etc., and reduce dazzling.

For the etching, a method of immersing the glass substrate as a material to be treated in a solution containing hydrogen fluoride as a main component is preferably used. As for the component other than hydrogen fluoride, an acid such as hydrochloric acid, nitric acid or citric acid may be contained. By virtue of containing an acid, a cationic component contained in the glass can be inhibited from reacting with the hydrogen fluoride to cause a precipitation reaction locally and in turn, in-plane uniform progress of etching can be ensured.

With respect to the surface profile after the AG treatment, the surface roughness (RMS) is preferably 0.01 μm or more and 0.5 μm or less, more preferably 0.01 μm or more and 0.3 μm or less, still more preferably 0.01 μm or more and 0.2 μm or less.

The RMS can be measured in conformity with the method specified in JTS B 0601 (2001). Specifically, using a laser microscope (trade name: VK-9700, manufactured by Keyence Corp.), a visual field range of 270 μm×200 μm was set for the measurement surface of a specimen, the height information of a baseplate was measured, and after performing cut-off correction, a mean square of the obtained heights is determined to calculate the surface roughness. At the time of performing this measurement, the cutoff value used is preferably 0.08 mm. The size of pores observed in the specimen surface is preferably 10 µm or less. Within this range, both prevention of dazzling and anti-glare property can be achieved.

In the case of conducting an anti-glare treatment, the treatment is preferably conducted before the later-described chamfering.

(Connecting Surface)

The glass substrate of this embodiment has a pair of main surfaces, an edge surface arranged along a direction orthogonal to the pair of main surfaces, and a connecting surface arranged between the main surface and the edge surface.

The "direction orthogonal to" as used herein means such a positional relationship that the angle made by a tangential plane around the edge surface of the main surface and a plane including the edge surface becomes substantially 90°.

The connecting surface may intersect the main surface and the edge surface at an angle of more than 0° and less than 180°. In this case, the angle at which the connecting surface intersects the main surface is preferably 40° or more and 55° or less, more preferably 42° or more and 52° or less, still more preferably 44° or more and 49° or less. Within this range, even when the contact angle between the outer peripheral edge of the printing layer and the connecting surface is small, the edge portion of the printing layer can be prevented from sliding down the connecting surface, and this facilitates maintaining the linearity of the printing layer.

The connecting surface may be smoothly connected to the main surface. In this case, the curvature radius of the boundary curve (hereinafter, sometimes referred to as "R of the boundary curve") between the main surface and the connecting surface is preferably 50 vim or more and 350 µm or less, more preferably 70 µm or more and 350 µm or less, still more preferably 90 µm or more and 300 µm or less. Within this range, even when the contact angle between the outer peripheral edge of the printing layer and the connecting surface is small, the edge portion of the printing layer can be prevented from sliding down the connecting surface, and this facilitates maintaining the linearity of the printing layer.

The roughness (Ra specified in JIS B0601 (2001)) of the connecting surface is preferably 0.05 µm or more and 0.5 µm or less, more preferably 0.07 µm or more and 0.45 vim or less, still more preferably 0.1 µm or more and 0.4 µm or less. Within this range, the edge impact resistance can be maintained, the contact angle between the outer peripheral edge of the printing layer and the connecting surface can be kept high, and optical interference of a functional layer on the connecting surface can be reduced.

The connecting surface has a plurality of concave portions (pores). The pore may appear as a substantially circular shape when the connecting surface is viewed from normal direction. The boundary portion between respective pores may have a sharp projection shape (sometimes referred to as a ridge). The particle diameter of the pore is calculated according to the following procedure based on the measurement results of a laser microscope. First, the height of the surface from a reference plane at each measurement point is determined on the connecting surface. The reference plane is a plane subjected to tilt correction and parallel to a least-square plane of the surface. Subsequently, a height corresponding to a cumulative number 90% in the cumulative distribution (on a number basis) of the height is taken as a reference height. More specifically, the reference height is a height at which when the measurement points are arranged in order of height and the cumulative number at the measurement point is counted in sequence from lower height to higher height, the cumulative number becomes 90% of the total number of measurement points.

Thereafter, a laser microscope image is binarized into a portion where the height exceeds the reference height and a portion where the height is not more than the reference height. After that, the pore is defined for every connected portion which is a portion where the height is not more than the reference height. The longitudinal-direction dimension (major axis) and the dimension (minor axis) in a direction orthogonal to the longitudinal-direction dimension are determined for each pore, and a root-mean-square of the major axis and minor axis (a square root of the average value of a square of the major axis and a square of the minor axis) is calculated. The calculated root-mean-square is taken as the pore size (particle diameter) of each pore.

The pore size corresponding to a cumulative number 90% in the cumulative distribution (on a number basis) of the pore size is preferably 40 µm or less.

The dispersion of the particle diameter of pores is preferably 5 µm or less, more preferably 4 µm or less. Within this range, an effect of reducing variation in the edge impact resistance is obtained. The particle diameter dispersion of pores is preferably 1 µm or more, more preferably 1.5 µm or more. Within this range, an effect of reducing orientation of scattered light due to an excessively uniform pore size is obtained.

As concerns the pores in the connecting surface, the difference between the 50% particle diameter in a portion 20 µm distant from the main surface and the 50% particle diameter in a portion 20 µm distant from the edge surface is preferably 10 µm or less, more preferably 7 µm or less. The portion 20 µm distant from the main surface indicates a portion 20 µm distant from the outer peripheral edge of the main surface. The portion 20 µm distant from the edge surface indicates a portion 20 µm distant from the outer peripheral edge of the edge surface. Within this range, an effect of enabling realization of a uniform color tint while having edge impact resistance is obtained.

The 50% particle diameter as used herein indicates a pore diameter corresponding to a cumulative number 50% in the cumulative distribution (on a number basis) of the pore diameter.

The connecting surface is preferably provided on both sides of the edge surface. By providing the connecting surface on both sides of the edge surface, the edge impact resistance can be more enhanced.

In the case where the connecting surface is provided on both sides of the edge surface, the shape may be different between both sides. For example, the connecting surface on the main surface side working out to a person side when installed in a display device may be configured to be curved (R-chamfering), and the connecting surface on the main surface side working out to a casing side may be configured to be linear (C-chamfering).

The connecting surface is not particularly limited in its production method but can be obtained, for example, by conducting chamfering of grinding the edge surface by a grinding wheel, and then conducting an etching treatment by use of an etching solution containing an acid.

In the chamfering, the edge surface and the connecting surface are formed on the glass substrate.

The chamfering method is not particularly limited, and a known method may be used. Suitable examples thereof include a method by grinding using a grinding wheel. As the grinding wheel, for example, a rotating grinding wheel, etc. is used. In the rotating grinding wheel, as an example, an annular grinding groove extending in the circumferential direction is formed, and the wall surface of the grinding groove contains abrasive grains such as alumina, silicon carbide and diamond.

The abrasive grain is preferably of grit size #400 or less, more preferably of grit size #600 or less. Use of such an abrasive grain makes it easy for the shape of pores after the later-described etching treatment to fall in a predetermined range.

On the edge surface and connecting surface, fine scratches are likely to be formed by chamfering. This scratch is considered to reduce the edge impact resistance. Accordingly, it is preferable to conduct an etching treatment so as to decrease the fine scratches and enhance the edge impact resistance.

The etching treatment is a treatment of bringing the edge surface and connecting surface into contact with an etching solution containing an acid. By this etching treatment, fine scratches generated by chamfering are spread to form a plurality of concave portions (pores).

The etching solution is not particularly limited as long as it can etch the glass substrate, but the etching solution is suitably an etching solution containing hydrogen fluoride (HF). Specific examples of such an etching solution include a mixed acid containing hydrogen fluoride and at least one acid selected from sulfuric acid, nitric acid, acetic acid and fluorosilicic acid.

The etching amount is controlled by the contact time with the solution. The concentration of hydrogen fluoride in the etching solution is adjusted by the etching amount according to the type of glass or the etching amount. The etching amount is preferably 25 µm or more and 100 µm or less, more preferably 30 µm or more and 90 µm or less. By setting the etching amount to this range, the printing linearity can be maintained while having edge impact resistance.

Before the etching treatment, protective films are preferably laminated to the pair of main surfaces so that the edge surface and connecting surface are preferentially treated with the etching solution. This makes it possible to prevent the main surface from being etched, and, for example, in the case where an anti-glare treatment has been applied to the main surface, the anti-glare effect can be maintained.

The protective film is not particularly limited as long as it has resistance to the etching solution, and, for example, a resin film such as polypropylene (PP) film, polyethylene (PE) film and polyethylene terephthalate (PET) film is favorably used. On the protective film, an adhesive capable of adhering to the glass substrate is preferably provided. The material of the adhesive is not particularly limited, but, for example, a silicone-based adhesive, an acrylic adhesive, and a polyurethane-based adhesive are favorably used.

The area of the protective film is preferably larger than the area of the glass substrate. The distance from the outer peripheral edge of the protective film to the edge surface of the glass substrate is preferably 0.3 mm or more and 1.5 mm or less. This distance provides an effect that the edge surface and connecting surface can be uniformly etched while preventing the etching solution from flowing into the main surface.

The thickness of the protective film is preferably 50 µm or more and 200 µm or less. Within this range, a portion of the protective film, which projects from the glass substrate, can be prevented from sagging and in turn, the etching treatment can be caused to uniformly proceed throughout the connecting surface.

The method for bringing the connecting surface and edge surface into contact with the etching solution includes, for example, a method of immersing the surfaces in the etching solution, and a method of spraying the etching solution toward the connecting surface and edge surface.

In this embodiment, with respect to pores in the connecting surface, the difference between the 50% particle diameter in a portion 20 µm distant from the main surface and the 50% particle diameter in a portion 20 µm distant from the edge surface is preferably 10 µm or less. That is, it is preferred that the etching treatment uniformly proceeds throughout the connecting surface. In the conventional technique (Patent Literature 1), the uniformity throughout the connecting surface is not taken into particular consideration. Accordingly, in order to enhance the edge impact resistance, a potion hard to be etched needs to be sufficiently treated. It was revealed that in turn, other portions become excessively smooth and, for example, in the case of providing a printing layer, ink dripping occurs to impair the appearance, or in the case of providing a functional layer, optical interference occurs to cause a phenomenon of a difference in color between the connecting surface and the main surface.

The uniformity of pores can be achieved, for example, by spraying the etching solution toward the connecting surface and edge surface. At this time, as for the spraying conditions, it is preferred that the etching solution is sprayed from normal direction of the edge surface and the spray amount is from 50 mL or more and 300 mL or less per minute per unit square cm. By performing the spraying under such conditions, the etching solution sufficiently spreads over the connecting surface to the vicinity of the main surface and at the same time, the surface-protecting film is prevented from separating and allowing the etching solution to enter the main surface side. As a result, pores are uniformly formed.

The uniformity can also be achieved by bringing the edge surface and connecting surface into contact with pure water, an aqueous polyacrylic acid solution, or an aqueous 0.5% hydrofluoric acid solution before they are contacted with the etching solution. In this case, air bubbles are prevented from entering between the main surface-protecting film and the connecting surface and inhibiting the etching and consequently, pores are uniformly formed.

(Printing Layer)

The glass substrate may have a printing layer on the main surface and the connecting surface. The printing layer may be a light-blocking part which hides any portion that may lie within the field of view to constitute an obstacle to viewing displayed images, such as wiring circuits arranged around the periphery of the display panel, and which thereby heightens the visibility of displayed images and the appearance attractiveness. The printing layer may be one including characters, a pattern, etc.

The printing layer is formed by printing an ink. Usable printing methods include bar coating, reverse coating, gravure coating, die coating, roll coating, screen printing, ink-jet printing, and the like. The screen printing or ink-jet printing is preferred because printing by these methods is easy and is possible on various substrates and can be performed in accordance with the sizes of substrates.

The ink to be used is not particularly limited. Usable as the ink is an inorganic ink containing a ceramics fired body, etc. and an organic ink containing a colorant, such as a dye or a pigment, and an organic resin.

Examples of the ceramics contained in the inorganic ink include oxides such as chromium oxide and iron oxide, carbides such as chromium carbide and tungsten carbide, carbon black, and mica. A printing layer is obtained by melting an ink including both the ceramics and silica, printing the molten ink so as to form a desired pattern, and then burning the printed ink. This inorganic ink necessitates melting and burning steps and is commonly used as an ink exclusively for glasses.

The organic ink is a composition including a dye or pigment and an organic resin. Examples of the organic resin include: homopolymers such as epoxy resins, acrylic resins, poly(ethylene terephthalate), polyethersulfones, polyarylates, polycarbonates, transparent ABS resins, phenolic resins, acrylonitrile/butadiene/styrene resins, polyurethanes, poly(methyl methacrylate), polyvinyl s, poly(vinyl butyral), polyetheretherketones, polyethylene, polyesters, polypropylene, polyamides, and polyimides; and resins each constituted of a copolymer of any of the monomers for those resins with one or more monomers copolymerizable therewith. As the dye or pigment, any dye or pigment having light-blocking properties can be used without particular limitations.

Of the organic inks and the inorganic inks, the organic inks are preferable because of the lower burning temperature thereof. From the standpoint of chemical resistance, the organic inks containing pigment are more preferred.

At least a part of the outer peripheral edge of the printing layer is preferably laid on the connecting surface. When the outer peripheral edge is laid on the connecting surface, the shielding extends even to the edge of the glass substrate, and this is advantageous from an aesthetic viewpoint.

Figure 1:
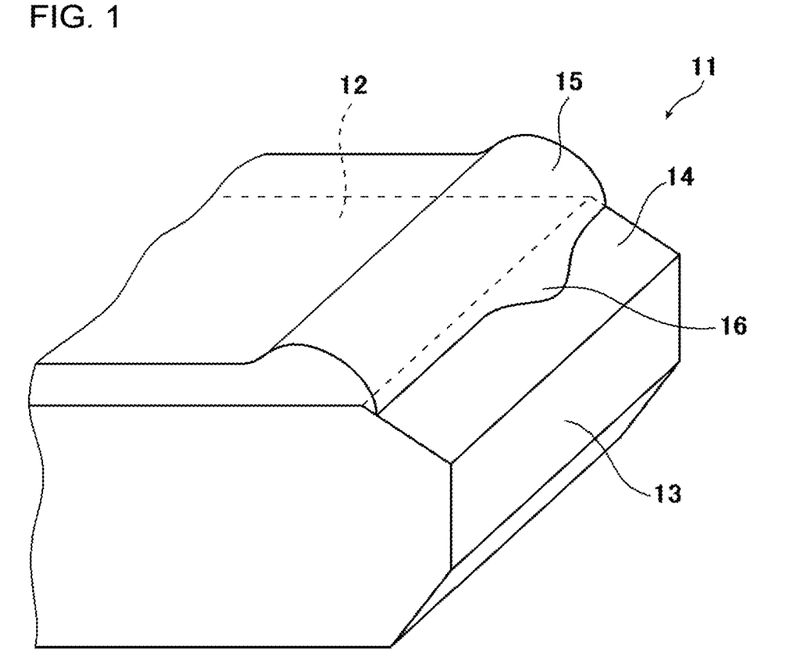
FIG. 1 illustrates a configuration near the connecting surface in a conventional example.

In FIG. 1, in the case where at least a part of the outer peripheral edge of the printing layer 15 is laid on the connecting surface 14, depending on the properties of the connecting surface 14, the contact angle of the ink 16 of the printing layer 15 with the connecting surface 14 is low, and the ink 16 sometimes slides down locally to deteriorate the linearity of the outer peripheral edge of the printing layer 15. FIG. 1 illustrates the vicinity of the connecting surface in such a case.

The linearity referred to herein is defined as follows. First, the outer peripheral edge of the printing layer is observed at a magnification of 1,000 times by use of an optical microscope (for example, VHX-5000 manufactured by Keyence Corp.), and in a 1 mm-long outer peripheral line included in the visual field range, a straight line L abutting the outer peripheral line on the printing layer side is drawn. Subsequently, a straight line L1 is moved from the position of the straight line L in a direction perpendicular to the straight line L and at the same time, in an outward direction of the printing layer and moved until reaching a position where the straight line L1 contacts at one point with the outer peripheral edge of the printing layer. The linearity is defined as the distance between the straight line L and the straight line L1. When the linearity is 0, the outer peripheral edge of the printing layer is a perfect straight line. When it is more than 0, this means that a portion where the printing layer locally projects is present in a direction extending from the connecting surface to the edge surface. In the case where such a projection portion is visible, the aesthetic appearance of the printing layer is disadvantageously impaired.

In this embodiment, the particle diameter of pores in the connecting surface is adjusted, and the contact angle between the ink and the glass substrate can thereby be kept relatively high. More specifically, according to the so-called Cassie-Baxter or Wenzel's equation, the irregularities can make the contact angle relatively high and can prevent the ink from locally sliding down.

The linearity is preferably 200 μm or less, more preferably 100 μm or less. When the linearity is 200 μm or less, the projection can hardly be visually recognized with eyes, and the linearity is recognized as good linearity with eyes.

(Functional Layer)

It is preferred that a functional layer is formed on at least a part of the main surface, connecting surface and edge surface of the glass substrate. The functional layer is a single layer or a laminate in which a plurality of layers are stacked. Examples of the functional layer include an antifouling layer, an antiglare layer, an antireflection layer (low-reflection layer), and an adhesion layer. Each functional layer is described in detail below.

[Antifouling Layer]

The antifouling layer is either a film which prevent organic matter or inorganic matter from adhering to the surface thereof or a layer which has an effect wherein even when organic matter or inorganic matter has adhered to the surface thereof, the adherent substance can be easily removed by clearing such as wiping.

It is preferable that the antifouling layer is formed on the surface of the adhesion layer which is described later. The antifouling layer is not particularly limited so long as this layer is capable of imparting nonfouling properties to the glass substrate. However, the antifouling layer is preferably constituted of a fluorine-containing organosilicon compound coating film obtained by curing a fluorine-containing organosilicon compound by a hydrolytic condensation reaction.

The thickness of the antifouling layer is not particularly limited. However, in the case where the antifouling layer is constituted of a fluorine-containing organosilicon compound coating film, the thickness is preferably 2 nm or larger and 20 nm or less, more preferably 2 nm or larger and 15 nm or less, still more preferably 2 nm or larger and 10 nm or less. In the case where the thickness of the antifouling layer is 2 nm or larger, the glass substrate withstands practical use from the standpoint of abrasion resistance. Meanwhile, in the case where the thickness of the antifouling layer is 20 nm or less, the glass substrate in the state of having the antifouling layer formed thereon has satisfactory optical properties including haze.

For forming the antifouling layer, any composition which contains a fluorine-containing hydrolyzable silicon compound and which is capable of forming the antifouling layer by a dry deposition method can be used without particular limitations. The composition for antifouling-layer formation may contain optional ingredients besides the fluorine-containing hydrolyzable silicon compound, or may be constituted only of one or more fluorine-containing hydrolyzable silicon compounds. Examples of the optional ingredients include hydrolyzable silicon compounds having no fluorine atom (hereinafter referred to as "non-fluorinated hydrolyzable silicon compounds"), which may be used so long as the effects of this embodiment are not lessened thereby, and catalysts.

When incorporating a fluorine-containing hydrolyzable silicon compound and a non-fluorinated hydrolyzable silicon compound, which is optional, into a composition for coating film formation, these compounds may be incorporated as such or may be incorporated as products of partial hydrolysis and condensation thereof. A mixture of these compounds with products of partial hydrolysis and condensation thereof may be incorporated into a composition for coating film formation.

In the case of using two or more hydrolyzable silicon compounds in combination, these compounds may be incorporated as such into a composition for coating film formation or may each be incorporated as a product of partial hydrolysis and condensation. Two or more of these compounds may be incorporated as a product of partial hydrolysis and co-condensation thereof. The composition may be a mixture of these compounds, the products of partial hydrolysis and condensation, and the product of partial hydrolysis and co-condensation. However, the products of partial hydrolysis and condensation and product of partial hydrolysis and co-condensation to be used are ones each having a degree of polymerization that renders film formation by a dry deposition method possible. Hereinafter, the term "hydrolyzable silicon compounds" is used so as to not only mean the compounds themselves but also imply any of such products of partial hydrolysis and condensation and products of partial hydrolysis and co-condensation.

The fluorine-containing hydrolyzable silicon compound to be sued for forming the fluorine-containing organosilicon compound coating film according to this embodiment is not particularly limited so long as the fluorine-containing organosilicon compound coating film obtained therefrom has antifouling properties including water repellency and oil repellency.

Specifically, examples of the fluorine-containing hydrolyzable silicon include fluorine-containing hydrolyzable silicon compounds each having one or more groups selected from the group consisting of a perfluoropolyether group, a perfluoroalkylene group, and a perfluoroalkyl group. These groups are each present as a fluorine-containing organic group bonded to the silicon atom of a hydrolyzable silyl group either via a connecting group or directly. Advantageously usable commercial products of such fluorine-containing organosilicon compounds each having one or more groups selected from the group consisting of a perfluoropolyether group, a perfluoroalkylene group, and a perfluoroalkyl group (fluorine-containing hydrolyzable silicon compounds) include KP-801 (trade name; manufactured by Shin-Etsu Chemical Co., Ltd), X-71 (trade name; manufactured by Shin-Etsu Chemical Co., Ltd), KY-130 (trade name; manufactured by Shin-Etsu Chemical Co., Ltd), KY-178 (trade name; manufactured by Shin-Etsu Chemical Co., Ltd), KY-185 (trade name; manufactured by Shin-Etsu Chemical Co., Ltd), KY-195 (trade name; manufactured by Shin-Etsu Chemical Co., Ltd), AFLUID (registered trademark) S-550 (trade name; manufactured by AGC Inc.), and OPTOOL (registered trademark) DSX (trade name; manufactured by Daikin Industries, Ltd.). It is more preferred to use KY-195, OPTOOL DSX, or S-550 among these.

[Adhesion Layer]

The adhesion layer is arranged between the glass substrate and the antifouling layer in order to improve the durability of the antifouling layer. It is preferable that the adhesion layer includes an outermost layer including silicon oxide as a main component, from the standpoint of adhesion to the antifouling layer. The adhesion layer can be made to simultaneously have antireflection performance or the like by forming the adhesion layer by laminating one layer or a plurality of layers.

The term "main component" herein means a component contained in the layer in an amount of 80% by mass or larger.

In the case where the adhesion layer is a stacking, the adhesion layer can be configured as a low-reflection layer which is composed of stacked layers including the low-refractive-index layer and high-refractive-index layer that is described later and in which the layer to be in contact with the antifouling layer is a low-refractive-index layer made of silicon oxide ($SiO_2$). In this case, the low-reflection layer functions as an adhesion layer being a stacking.

The surface roughness of the layer of the adhesion layer which is to be in contact with the antifouling layer is preferably 3 nm or less, more preferably 2 nm or less, still more preferably 1.5 nm or less, in terms of arithmetic mean roughness (Ra). In the case where the Ra is 3 nm or less, this surface roughness makes the antifouling layer have such surface irregularities that a cloth or the like can deform along the surface irregularities and hence imposes a load approximately evenly on the entire surface of the antifouling layer. The antifouling layer is thereby prevented from peeling off and has improved wear resistance.

In examining the adhesion layer for arithmetic mean roughness (Ra) when the main surface has surface irregularities, a measurement region may be set so that the surface irregularities are not detected. In the case where the diameter of the pore or root-mean-square surface roughness (RMS) is within the above preferred range, the Ra of the adhesion layer can be made determinable, for example, by setting a measurement region which does not include any ridge of the surface irregularities.

In the case where the main surface of the glass substrate has surface irregularities, the layer of the adhesion layer which is to be in contact with the antifouling layer has a square-mean-root surface roughness (RMS) of preferably 10 nm or higher, more preferably 20 nm or higher. The RMS is preferably 1,500 nm or less, more preferably 1,000 nm or less, still more preferably 500 nm or less, especially preferably 200 nm or less. In the case where the RMS is within that range, not only the antifouling layer is prevented from peeling off and has improved wear resistance but also glitter-preventive properties or antiglare properties can also be attained. In determining the RMS of the surface irregularities, it is desirable that a measurement region is selected so as to sufficiently include pores therein unlike the measurement region selected for determining the arithmetic-mean surface roughness (Ra) of the adhesion layer described above. Since the surfaces of the adhesion layer and antifouling layer are sufficiently smooth, the value of RMS determined by the method described above, with the adhesion layer or antifouling layer, can be regarded as equal to the RMS of the surface irregularities.

[Low-Reflection Layer]

The low-reflection layer is a film which not only has a reflectance-reducing effect to reduce glaringness due to light reflection in the screen but also improves transmission of light from display devices or the like to improve the visibility of images displayed on the display devices or the like.

The glass substrate in this embodiment is preferably equipped with a low-reflection layer between at least a part of the main surface, the connecting layer, and the edge surface and the antifouling layer. The configuration of the low-reflection layer is not particularly limited so long as light reflection can be reduced thereby. For example, the low-reflection layer has a configuration composed of a stacking including a high-refractive-index layer having a refractive index at 550-nm wavelength of 1.9 or higher and a low-refractive-index layer having a refractive index at 550-nm wavelength of 1.6 or less. The low-reflection layer may be constituted of one layer only.

The low-reflection layer may have a configuration including one high-refractive-index layer and one low-refractive-index layer, or may have a configuration including two or more high-refractive-index layers and two or more low-refractive-index layers. In the case where the low-reflection film includes two or more high-refractive-index layers and two or more low-refractive-index layers, it is preferable that the two or more high-refractive-index layers and the two or more low-refractive-index layers are alternately stacked.

From the standpoint of enhancing the low-reflection properties, it is preferable that the low-reflection layer is a stacking composed of a plurality of stacked layers. For example, the stacking as a whole is composed of preferably two or more and ten or less of layers, more preferably two or more and eight or less of layers, still more preferably four or more and six or less of layers. The stacking preferably is one composed of stacked layers including one or more high-refractive-index layers and one or more low-refractive-index layers as described above. The total number of the high-refractive-index layer(s) and low-refractive-index layer(s) is more preferably within that range.

The materials of the high-refractive-index layers and low-refractive-index layers are not particularly limited, and can be suitably selected while taking account of the degree of required low-reflection properties, production efficiency, etc. For constituting the high-refractive-index layers, one or more materials selected from niobium oxide ($Nb_2O_5$), titanium oxide ($TiO_2$), zirconium oxide ($ZrO_2$), tantalum oxide ($Ta_2O_5$), and silicon nitride ($Si_3N_4$) is advantageously used. For constituting the low-refractive-index layers, one or more materials selected from silicon oxide ($SiO_2$), a material including a mixed oxide of Si and Sn, a material including a mixed oxide of Si and Zr, and a material including a mixed oxide of Si and Al is advantageously used.

Preferred from the standpoints of production efficiency and refractive index is a configuration in which the high-refractive-index layers are layers including, as a main component, one material selected from among niobium oxide, tantalum oxide, and silicon nitride and the low-refractive-index layers are layers including silicon oxide as a main component.

As described above, the low-reflection layer can be rendered usable also as an adhesion layer by constituting the outermost layer thereof so as to include silicon oxide as a main component.

[Methods for Forming the Functional Layer]

The functional layer according to this embodiment is formed by a dry deposition method. Examples of the dry deposition method include a vapor deposition method, an ion-beam-assisted vapor deposition method, ion plating, sputtering, and a plasma CVD method. Preferred of these is vapor deposition or sputtering.

In the case where the functional layer is composed of a plurality of layers, the functional layer may be formed using the above methods in combination. For example, use may be made of a method in which an adhesion layer is formed by sputtering and an antifouling layer is thereafter formed by vapor deposition.

In the case of forming an antifouling layer, it is preferred to use vapor deposition. More preferred of vapor deposition methods are a resistance-heating method and an electron-beam vapor deposition method.

In the case of forming an adhesion layer or a low-reflection layer, it is preferred to use vapor deposition of sputtering. It is more preferable that either ion-assisted vapor deposition in which a film is deposited while forming a plasma, among vapor deposition methods, or sputtering is used in order to obtain a denser film.

Generally used methods for sputtering are magnetron sputtering methods, and preferred of these are pulse magnetron sputtering, AC magnetron sputtering, and post-oxidation magnetron sputtering.

In the case where such methods are used, a functional layer which is dense and has an accurately regulated thickness can be obtained.

The functional layer has a nanometer thickness as described above and therefore, when the functional layer is smooth, optical interference occurs within the film. In general, when optical interference occurs, the color changes depending on the angle at which the functional layer is viewed. In the case where a functional layer is provided on the main surface and the connecting surface, a part of the connecting surface and the main surface make an angle of more than 0°. In this case, the color of the connecting surface looks significantly different from the color of the main surface, giving rise to an aesthetic problem.

As described above, in Patent Literature 1, the uniformity throughout the connecting surface is not taken into particular consideration and in order to enhance the edge impact resistance, a potion hard to be etched needs to be sufficiently treated. It was revealed that in turn, other portions become excessively smooth and optical interference occurs on the connecting surface to bring about a problem of a considerable difference in color from the main surface.

In this embodiment, the particle diameter of pores is set to be 10 μm or more, and this prevents the connecting surface from becoming extremely smooth and suppresses occurrence of optical interference of the functional layer within the film, so that a significant difference in color between the main surface and the connecting surface can be reduced.

Furthermore, in this embodiment, as concerns the surficial pores present in the connecting surface, the difference between the 50% particle diameter in a portion 20 μm distant from the main surface and the 50% particle diameter in a portion 20 μm distant from the edge surface is preferably 10 μm or less. Within this range, the connecting surface has a uniform pore size and consequently, the color tint becomes uniform throughout the connecting surface.

The color tint as used herein indicates the color tint (a*, b*) specified in JIS Z 8781-4:2013.

The measurement of the color tint of the main surface is performed in the SCI mode by using a measuring instrument specified in ASTM E 1164:2012.

The color difference between the main surface and the connecting surface is determined according to the following equation:

$$\Delta E=\sqrt{[(\Delta a^*)^2+(\Delta b^*)^2]}$$

$\Delta a^*$ ($\Delta b^*$) is a difference in a* (b*) between the main surface and the connecting surface.

In the glass substrate with a functional layer of this embodiment, the color difference $\Delta E$ between the main surface and the connecting surface each having the functional layer is preferably 0 or more and 10 or less.

One embodiment of the present invention includes a glass substrate with a functional layer, including the above-described glass substrate with a printing layer. The glass substrate with a functional layer includes a second connecting surface arranged between the edge surface and the second main surface opposed to the first main surface which has the printing layer. The second connecting surface may have a plurality of pores. The difference between a 50% particle diameter of the pores in a portion 20 μm distant from the second main surface and a 50% particle diameter of the pores in a portion 20 μm distant from the edge surface may be 10 μm or less. The functional layer is provided on at least a part of the second main surface and the second connecting surface, and a color difference $\Delta E$ between the second main surface and the second connecting surface each having the functional layer may be 0 or more and 10 or less.

One embodiment of the present invention includes an in-vehicle display device including the above-described glass substrate, glass substrate with a printing layer, or glass substrate with a functional layer.

EXAMPLES

The present invention is specifically described below by referring to Examples, etc., however, the present invention is not limited by these Examples.

In the following, Examples 1 to 5 are Working Examples of the present invention, and Examples 11 and 12 are Comparative Examples.

In all Examples, an aluminosilicate glass (DRAGON-TRAIL (registered trademark), manufactured by AGC Inc.) having a size of 130 mm×280 mm and a thickness of 1.3 mm was used as the glass substrate.

Example 1

First, the side surface of the glass substrate was chamfered with a grinding wheel. The chamfer shape was C-chamfer plane, and the chamfer width was 0.15 mm. The grinding wheel used was an electrodeposited diamond grinding wheel, the grit size was #325 for rough processing and #700 for finish processing, and the rotational speed was 6,000 rpm.

Next, a protective film using PET as the base material and having a thickness of 70 μm (manufactured by Sumiron Co., Ltd.), which is coated with an acrylic glue and cut into a size of 131 mm×281 mm, was prepared.

Subsequently, the protective film was laminated on the entire surfaces of both main surfaces of the glass substrate to protrude 0.5 mm from the outer peripheral edge of the glass substrate, and a glass substrate with a protective film was thereby obtained.

Thereafter, an etching solution prepared by mixing 5 mass % of hydrofluoric acid and 2 mass % of hydrochloric acid was sprayed on the glass substrate with a protective film at a flow rate of 150 mL/(min·cm$^2$), and etching was performed such that the etching amount becomes 60 μm.

At this time, the spraying angle of the etching solution relative to the glass substrate was 90°, the distance between a spraying nozzle and the glass substrate was 2 cm, and the quantity of water sprayed from the spraying nozzle was 150 mL/min.

The etching amount was measured by arranging a two-point alignment mark on the baseplate, measuring the glass shape before and after the etching treatment by means of a three-dimensional measuring instrument (manufactured by Mitutoyo Corporation), and determining a difference.

The glass substrate was separated from the protective films on both surfaces to obtain a glass substrate in which the edge portion of the substrate was etched.

Example 2

The treatment was performed in the same manner as in Example 1 except that 2 mass % of hydrochloric acid of the etching solution was changed to 2 mass % of nitric acid.

Example 3

The treatment was performed in the same manner as in Example 1 except that the etching amount was changed to 80 μm.

Example 4

A protective film-attached glass substrate made in the same manner as in Example 1 was etched by immersing it in an etching solution prepared by mixing 5 mass % of hydrofluoric acid and 2 mass % of hydrochloric acid. In this treatment, pure water was sprayed in advance on the edge portion of the glass substrate to cover the edge portion of the substrate. The immersion time was adjusted such that the etching amount becomes 60 μm.

Thus, a glass substrate in which the edge portion is etched was obtained.

Example 5

The same protective film as that in Example 1 was cut into a size of 130.6 mm 280.6 mm and laminated to a glass substrate which was chamfered in the same manner as in Example 1. On this occasion, the film was laminated such that the outer periphery of the protective film protrudes 0.3 mm from the outer periphery of the glass substrate.

Treatment except for these was performed in the same as in Example 1.

Example 11

Example 11 corresponds to Example 4 described in Patent Literature 1. First, the same protective film as that in Example 1 was cut into a size of 134 mm×284 mm and laminated to a glass substrate which was chamfered in the same manner as in Example 1. On this occasion, the film was laminated such that the outer periphery of the protective film protrudes 2 mm from the outer periphery of the glass substrate. Subsequently, the protective film-attached glass substrate was etched by immersing it in an etching solution prepared by mixing 2 mass % of hydrofluoric acid and 18 mass % of hydrochloric acid. At this time, advance spraying performed in Example 4 was not conducted. The immersion time was adjusted such that the etching amount becomes 40 μm.

Example 12

The treatment was performed in the same manner as in Example 1 except that the side surface of the glass substrate was R-chamfered. Specifically, an electrodeposited diamond grinding wheel was used as the grinding wheel, the grit size was #325 for rough processing and #700 for finish processing, and the rotational speed was 6,000 rpm. In addition, the curvature radius of the chamfered portion was 0.5 mm, the angle made by the connecting surface and the main surface was 68°, and the chamfer width was 0.55 mm.

Treatment conditions of Examples 1 to 5, 11 and 12 are shown together and tabulated in Table 1 below.

TABLE 1

|  | Example 1 | Example 2 | Example 3 | Example 4 | Example 5 | Example 11 | Example 12 |
|---|---|---|---|---|---|---|---|
| Grinding method of edge surface | CNC C-plane | CNC C-plane | CNC C-plane | CNC C-plane | CNC C-plane | CNC C-plane | CNC R-plane |
| Thickness (μm) of base material of protective film | 70 | 70 | 70 | 70 | 70 | 70 | 30 |
| Protrusion amount (mm) from baseplate | 0.5 | 0.5 | 0.5 | 0.5 | 0.3 | 2 | 0.5 |
| Etching method | spray | spray | spray | immersion | spray | immersion | spray |
| Spray amount (mL/min · cm$^2$) | 150 | 150 | 150 | — | 150 | — | 150 |
| Hydrofluoric acid concentration (mass %) | 5 | 5 | 5 | 5 | 5 | 2 | 5 |

TABLE 1-continued

|  | Example 1 | Example 2 | Example 3 | Example 4 | Example 5 | Example 11 | Example 12 |
|---|---|---|---|---|---|---|---|
| Species of additional acid | hydrochloric acid | nitric acid | hydrochloric acid | hydrochloric acid | hydrochloric acid | hydrochloric acid | hydrochloric acid |
| Acid concentration (mass %) | 2 | 2 | 2 | 2 | 2 | 18 | 2 |
| Etching time (min) | 14 | 14 | 20 | 14 | 20 | 19 | 14 |
| Etching amount (μm) | 60 | 60 | 80 | 60 | 60 | 40 | 60 |
| Liquid contact treatment before etching | none | none | none | treated | none | none | none |
| Difference in particle diameter between near edge surface and near main surface (μm) | 8.2 | 7.8 | 5.2 | 4.8 | 5 | 17 | 16 |
| 90% Particle diameter (μm) | 27 | 30 | 50 | 30 | 31 | 26 | 35 |
| Angle made by main surface and connecting surface (°) | 45 | 53 | 41 | 47 | 41 | 54 | 65 |
| R of boundary between main surface and connecting surface (μm) | 122 | 120 | 303 | 80 | 140 | 258 | 442 |
| Particle diameter dispersion (μm) | 2.9 | 3.2 | 4.8 | 2.1 | 1.9 | 2.2 | 4.2 |
| Printing linearity (μm) | 40 | 40 | 90 | 50 | 80 | 320 | 280 |
| Color tint distribution ΔE | 3.6 | 4.7 | 2.7 | 3.2 | 6.2 | 12.1 | 10.8 |
| HIT Results | A | A | A | A | A | A | B |

With respect to the glass substrate of each Example prepared according to the above-described procedure, the following evaluations were conducted.

(Measurement of Pore Size)

Using a laser microscope (trade name: VK-9700, manufactured by Keyence Corp.), the height was measured in an image within a range of 270 μm×200 μm enlarging the connecting surface 1,000 times. At this time, the measurement interval in the transverse (X) direction and longitudinal (Y) direction was 0.1 μm, and the accuracy in the height (Z) direction was 0.001 μm. Subsequently, a height corresponding to a cumulative number 90% in the obtained cumulative distribution (on a number basis) of the height was taken as a reference height. The reference height is a height at which when the measurement points are arranged in order of height and the cumulative number at the measurement point is counted in sequence from lower height to higher height, the cumulative number becomes 90% of the total number of measurement points.

Thereafter, the laser microscope image above was binarized into a portion where the height exceeds the reference height and a portion where the height was not more than the reference height.

In this way, a portion where the height was not more than the reference height was defined as a pore.

After that, the longitudinal-direction dimension (major axis) and the dimension (minor axis) in a direction orthogonal to the longitudinal-direction dimension were determined for each pore, and a root-mean-square of the major axis and minor axis (a square root of the average value of a square of the major axis and a square of the minor axis) was calculated. The calculated root-mean-square was taken as the pore size (particle diameter) of each pore.

The dispersion was determined arithmetically with respect to the pore size of each pore.

Furthermore, using respective pore sizes of pores, a pore size corresponding to a cumulative number 90% in the cumulative distribution (on a number basis) from the smaller pore size side was taken as the 90% pore size.

The same binarized image was acquired near 20 μm from the main surface and near 20 μm from the edge surface, a 50% pore size corresponding to a cumulative number 50% in a cumulative distribution (on a number basis) from the smaller pore size side was acquired in each distribution, and a difference therebetween was determined.

(Measurement of Angle Made by Main Surface and Connecting Surface)

First, a 100-fold image was obtained in a direction of a line perpendicular to both the normal line of the main surface and the normal line of the connecting surface by using an optical microscope (VHX-5000, manufactured by Keyence Corp.).

Figure 2:
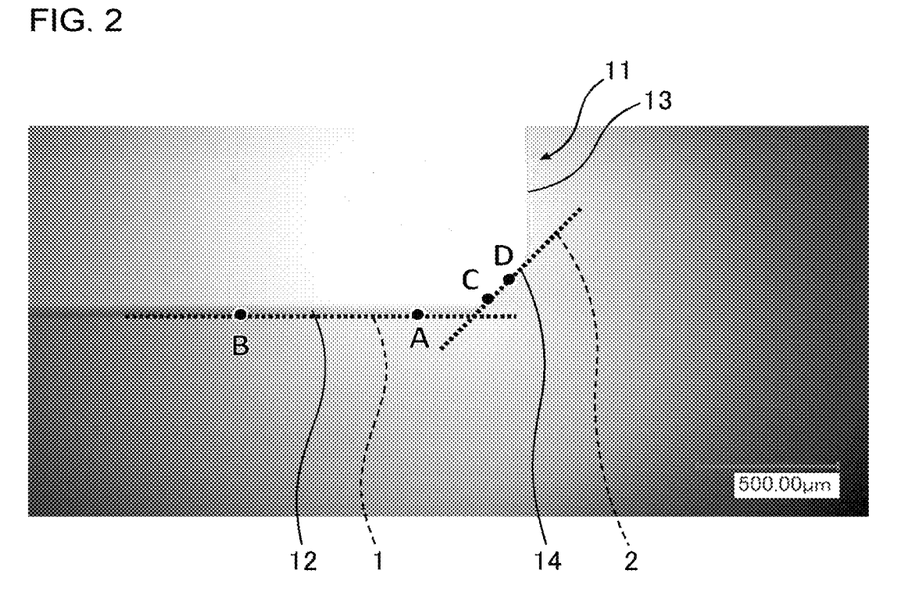
FIG. 2 is a diagram for explaining the angle between the connecting surface and the main surface.

FIG. 2 illustrates the measurement image obtained in Example 1. In the following, the measurement is described based on FIG. 2.

Next, a straight line passing, on the main surface 12 side, point A and point B which are 200 μm distant and 700 μm distant, respectively, relative to the connection point between the main surface 12 and the connecting surface 14, is designated as line 1. Subsequently, a straight line passing, on the connecting surface 14 side, point C and point D which are 80 μm distant and 180 μm distant, respectively, is designated as line 2. An angle made by these two straight lines was defined as a value obtained by subtracting the angle between the main surface 12 and the connecting surface 14 from 180°.

(Printing Linearity)

A 20 mm-wide region at the outer peripheral edge of one main surface of the glass substrate was coated with black ink by a screen method to form a printing layer. On this occasion, the region was coated by adjusting the printing plate such that the outer peripheral edge of the printing layer coincides with a line intersecting the main surface and the connecting surface.

After that, the glass substrate with a printing layer was put in a drying furnace and dried at 130° C. for 60 minutes.

Subsequently, the printing linearity was evaluated by observing the outer peripheral edge portion of the glass substrate with a printing layer as follows.

First, an image enlarging the outer peripheral edge 1,000 times was acquired using a digital microscope (VHX-5000, manufactured by Keyence Corp.).

Figure 3:
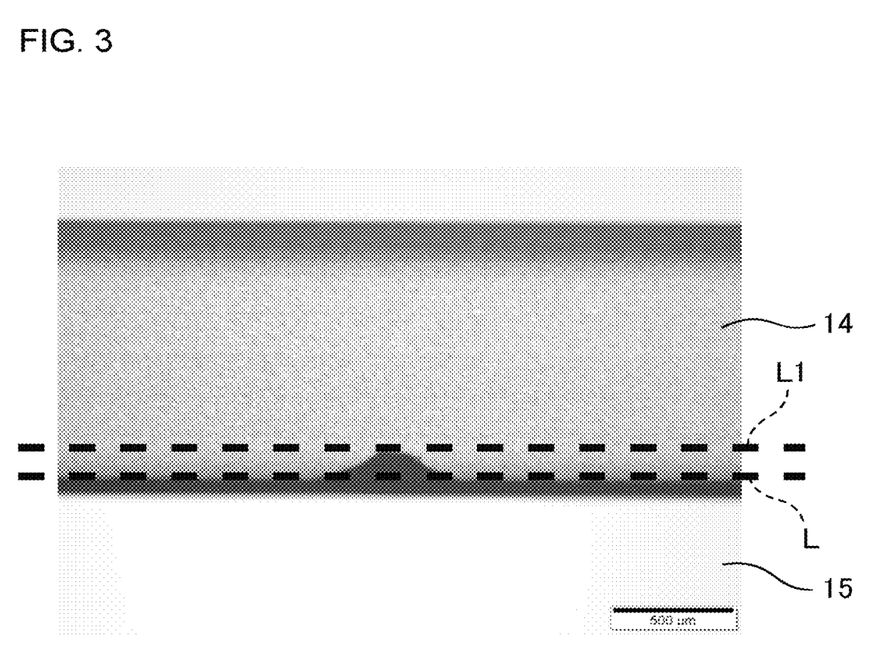
FIG. 3 is a diagram for explaining the printing linearity.

FIG. 3 illustrates the image obtained in Example 1. In the following, the printing linearity is described based on FIG. 3.

Next, in an outer peripheral line of a 1 mm-long printing layer 15 included in the visual field range of the image above, a straight line abutting the outer peripheral line on the printing layer 15 side was drawn and designated as line L. Subsequently, a straight line L1 was moved from the position of the straight line L in a direction perpendicular to the straight line L and at the same time, in an outward direction of the printing layer 15 and moved until reaching a position where the straight line L1 contacts at one point with the outer peripheral edge of the printing layer 15. The linearity was defined as the distance between the straight line L and the straight line L1.

(Color Tint Distribution)

An antireflection layer was formed by the following method on another main surface and the connecting surface of the glass substrate obtained in each Example.

First, the glass substrate of each Example was introduced into a chamber. Next, while introducing a mixed gas obtained by mixing argon gas with 10 vol % oxygen gas into the chamber, AC rotary dual magnetron sputtering was performed under the conditions of a pressure of 0.5 Pa, a frequency of 40 kHz, and a power of 15 kW by using a cylindrical niobium oxide target (trade name, NBO Target; manufactured by AGC Ceramics Co., Ltd.) of 1,000 mm (length)×150 mm (outer diameter), and a 13 nm-thick high-refractive-index layer (first layer) composed of niobium oxide (niobia) was thereby formed.

Thereafter, while introducing a mixed gas obtained by mixing argon with 40 vol % oxygen gas into the chamber, AC rotary dual magnetron sputtering was performed under the conditions of a pressure of 0.3 Pa, a frequency of 40 kHz, and a power of 10 kW by using a cylindrical silicon target (manufactured by AGC Ceramics Co., Ltd.) of 1,000 mm (length)×150 mm (outer diameter), and a 35 nm-thick low-refractive-index layer (second layer) composed of silicon oxide (silica) was formed on the high-refractive-index layer.

Subsequently, a 115 nm-thick high-refractive-index layer composed of niobium oxide (niobia) was formed on the low-refractive-index layer, i.e., the second layer, in the same manner as the first layer. Furthermore, an 80 nm-thick low-refractive-index layer composed of silicon oxide (silica) was formed in the same manner as the second layer. In this way, an adhesion layer (low reflection film) in which a total of four layers, i.e., two niobium oxide (niobia) layers and two silicon oxide (silica) layers, i.e., are stacked, was formed.

In this way, a glass substrate with an antireflection layer was obtained.

After that, measurement of colors of the main surface and connecting surface of the obtained glass substrate with an antireflection layer was conducted. A spectral reflectance was acquired using a microspectrophotometer (USPM RUM, manufactured by Olympus Co., Ltd.) as the measuring device. In preparation for the measurement, a position of the substrate, where the reflectance becomes maximum, was determined beforehand, and the measurement was adjusted so that a specular reflectance can be acquired. The color tint (a*, b*) of each of the main surface and the connecting surface was determined from the spectral reflectance.

Then, the color difference between the main surface and the connecting surface was determined according to the following equation:

$$\Delta E = \sqrt{[(\Delta a^*)^2 + (\Delta b^*)^2]}$$

Δa* (Δb*) is a difference in a* (b*) between the main surface and the connecting surface.

(Head Impact Test)

The test was performed in the same manner as in the head impact test described in Patent Literature 1.

As a result of the head impact test, "A" was assigned to a case where the glass substrate was not cracked, and "B" was assigned to a case where the glass substrate was cracked. When "A" is assigned, the glass substrate can be rated as having excellent edge impact resistance against hitting from an oblique direction.

These evaluation results are shown together in Table 1.

In Examples 1 to 5 where the difference in the pore size between near the edge surface and near the main surface is as small as 4.8 μm to 8.2 μm, the linearity of the ink was 40 μm to 90 μm, which is in an invisible range, and thus, the linearity was good.

On the other hand, in Example 11 where the difference in the pore size between near the edge surface and near the main surface is as large as 17 μm, the linearity of the ink is 320 μm, which is large enough to be visible, and thus, the linearity has an aesthetic problem. Note that Example 11 corresponds to Example 4 of Patent Literature 1.

In Example 12, the difference in the pore size between near the edge surface and near the main surface is as large as 16 μm, and R of the boundary portion between the main surface and the connecting surface is as large as 442 μm. In addition, the form of the edge portion was collapsed.

While the present invention has been described in detail and with reference to specific embodiments thereof, it will be apparent to one skilled in the art that various changes and modifications can be made therein without departing from the spirit and scope thereof.

This application is based on Japanese Patent Application No. 2019-093387 filed on May 17, 2019, the entire subject matter of which is incorporated herein by reference.

REFERENCE SIGNS LIST

11: Glass substrate
12: Main surface
13: Edge surface
14: Connecting surface
15: Printing layer
16: Ink

The invention claimed is:

1. A glass substrate comprising: a pair of main surfaces including a first main surface and a second main surface opposed to the first main surface; an edge surface arranged along a direction orthogonal to the pair of main surfaces; and a connecting surface arranged between the first main surface and the edge surface,
wherein the connecting surface has a plurality of pores, and
a difference between a 50% particle diameter of pores in a portion 20 μm distant from the first main surface and a 50% particle diameter of pores in a portion 20 μm distant from the edge surface is 10 μm or less.

2. The glass substrate according to claim 1,
wherein an angle made by the first main surface and the connecting surface is 40° or more and 55° or less.

3. The glass substrate according to claim 1,
wherein a curvature radius R of a boundary curve between the first main surface and the connecting surface is 350 μM or less.

4. The glass substrate according to claim 1,
wherein the plurality of pores in the connecting surface has a dispersion of a particle diameter of 5 μm or less.

5. The glass substrate according to claim 1,
wherein the plurality of pores has a 90% particle diameter of 10 μm or more.

6. A glass substrate with a printing layer, comprising the glass substrate according to claim 1,
wherein a printing layer is provided on at least a part of the first main surface and the connecting surface, at least a part of an outer peripheral edge of the printing layer is laid on the connecting surface, and the outer peripheral edge has a linearity of 100 µm or less.

7. A glass substrate with a functional layer, comprising the glass substrate according to claim 1, wherein a functional layer is provided on at least a part of the first main surface and the connecting surface, and a color difference ΔE between the first main surface and the connecting surface each having the functional layer is 0 or more and 10 or less.

8. A glass substrate with a functional layer, comprising the glass substrate according to claim 6, the glass substrate comprising a second connecting surface arranged between the second main surface and the edge surface, wherein the second connecting surface has a plurality of pores, a difference between a 50% particle diameter of said pores in a portion 20 µm distant from the second main surface and a 50% particle diameter of said pores in a portion 20 µm distant from the edge surface is 10 µm or less, a functional layer is provided on at least a part of the second main surface and the second connecting surface, and a color difference ΔE between the second main surface and the second connecting surface each having the functional layer is 0 or more and 10 or less.

9. An in-vehicle display device comprising the glass substrate according to claim 1.

10. An in-vehicle display device comprising the glass substrate with a printing layer according to claim 6.

11. An in-vehicle display device comprising the glass substrate with a functional layer according to claim 7.

12. An in-vehicle display device comprising the glass substrate with a functional layer according to claim 8.

* * * * *